Jan. 25, 1944. E. E. VAN CLEAVE Re. 22,427

HANDWHEEL BRAKE OPERATING MECHANISM

Original Filed June 16, 1937 2 Sheets-Sheet 1

Inventor:

Edwin E. Van Cleave,

Witness:

L. S. Abbot

By: Rummler Rummler & Woodworth

Attorneys.

Jan. 25, 1944. E. E. VAN CLEAVE Re. 22,427

HANDWHEEL BRAKE OPERATING MECHANISM

Original Filed June 16, 1937 2 Sheets-Sheet 2

Inventor:

Edwin E. Van Cleave,

By: Lummus Lummus & Woodworth

Attorneys.

Witness:

H. I. Sekel.

Reissued Jan. 25, 1944 Re. 22,427

UNITED STATES PATENT OFFICE 22,427

HANDWHEEL BRAKE OPERATING MECHANISM

Edwin E. Van Cleave, Chicago, Ill.

Original No. 2,207,500, dated July 9, 1940, Serial No. 148,520, June 16, 1937. Application for reissue March 26, 1941, Serial No. 385,379

18 Claims. (Cl. 74—505)

This invention relates to the class of brake operating means used on railway cars for supplementing air brakes to afford manually actuated brake application means. A principal purpose of the invention is the provision of a mechanism which is automatic to effect holding proportional to the degree of reverse rotation of the handwheel in a releasing direction; that is, when the handwheel is turned in that direction the mechanism cannot spin to full release position nor is the partial holding back of the brakes dependent upon the strength of the operator. The wheel may be given increments of motion by the operator in the releasing direction and at the termination of each increment of motion the brakes are held partially applied exactly according to the setting of the handwheel.

It is also an object of the invention to provide improvements in handbrake operating mechanism by simplifications enabling the use of few and efficient parts, compactness, and rapid easy assembly thereof and quick accessibility to all parts of the mechanism for the purpose of replacement, if necessary.

The objects of the invention are attained by means of a construction as illustrated in the drawings wherein.

Figure 1:
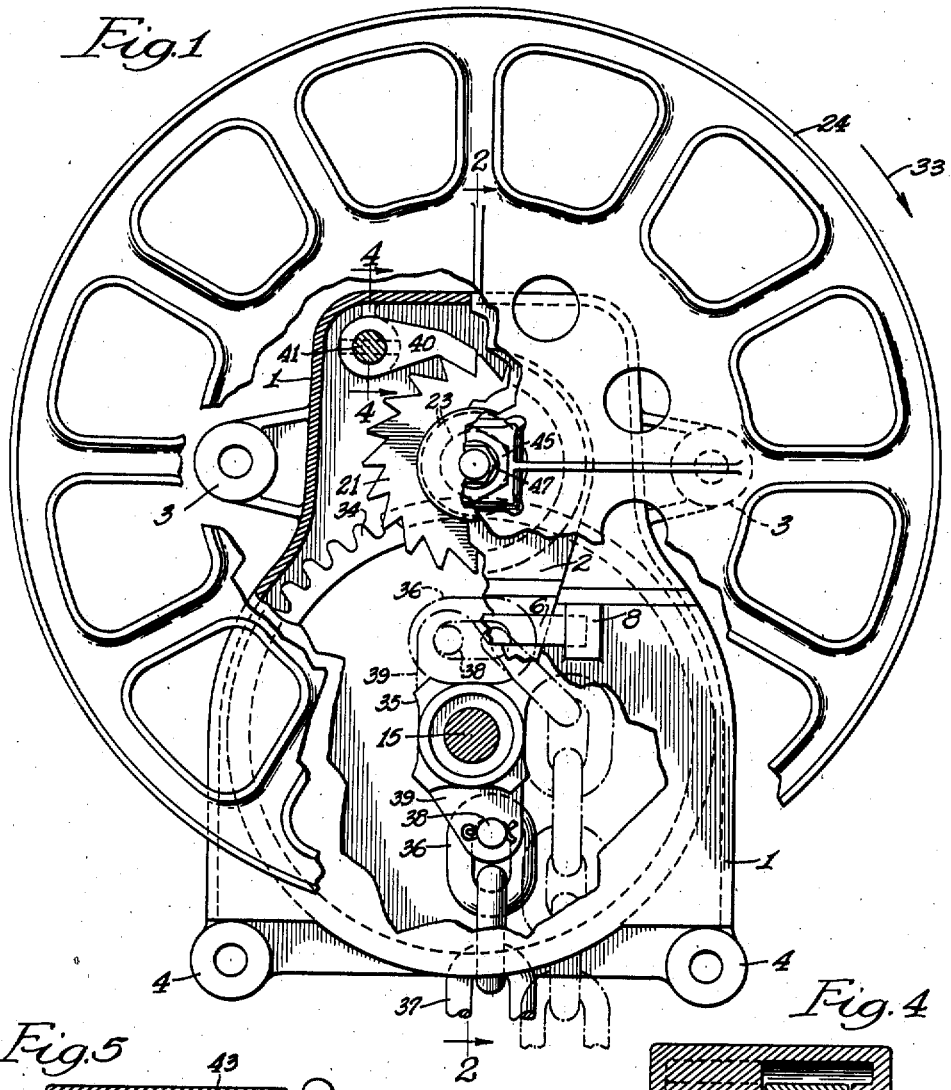
Figure 1 is a face view of the handwheel brake operating mechanism with the casing and wheel shown as partly broken away to expose the mechanism inside of the casing.

A distinguishing principle of the improvement with reference to other handbrake operating mechanisms is its action. The handwheel is secured to the pinion shaft by which motion is transmitted through gearing and the winding sprocket and chain, to the brake rigging.

Thus, there is a direct driving connection between the handwheel and the brake rigging and the handwheel would ordinarily spin in a reverse direction upon release of the brakes, were it not for a clutch arrangement which is automatic in its action to stop reverse motion of the handwheel and full release of the brake exactly in accordance to how far the operator turns the handwheel in the brake releasing direction. If the operator, by his own volition, spins the handwheel in a releasing direction faster than the automatic reverse motion of the brake mechanism, the brakes may move to fully released position without interruption.

When the operator moves the handwheel by step increments in a releasing direction, the mechanism provides for an automatic take-up which holds the brakes applied more or less according to the steps of movement given the handwheel.

This effect is produced by the use of the combination of a driving pinion and a handwheel connected by shaft means forming a positive drive for the brake mechanism, except for a slight relative motion between the handwheel and the pinion for the purpose of clutching and unclutching the shaft and pinion to a holding ratchet.

As shown in the drawings, the operating mechanism is supported in a casing 1 which may be riveted in the customary position on an end wall of a railway car at the perforated ears 3 and 4, integral with the casing. The casing is closed by a front plate 2. The housing preferably comprises spaced rigidly connected front and rear walls and has its bottom open. The plate 2 is mounted on the front face of front wall. This cover plate is held in assembled relation with the casing by a bar 6 passing through openings in lugs 7 and 8 formed on the casing. The bar is held in retaining position by cotter pin 9.

Casing 1 has the bosses 10 and 11 for receiving the bearing sleeves 12 and 13 for shafts 14 and 15. These shafts are also supported by bearing sleeves 16 and 17 carried in the bosses 18 and 19 formed on the cover plate 2. The cover plate is made to fit an annular opening 20 in the front wall of casing 1 which is equal to the diameter of a ratchet wheel 21. The ratchet wheel thus may be passed through this opening when the construction is assembled or disassembled. The boss 19 of plate 2 also fits a circular opening 22 in the front wall of casing 1 so that the shaft 15 may be withdrawn therethrough, permitting the winding mechanism to be dropped through the open bottom of the housing.

With this construction, accurate alinement of the bearings is easily maintained since the bosses 10 and 11 and the apertures 20 and 22 may accurately be formed in a jig, while the spacing of the bearings in the plate 2 may be controlled with similar accuracy. By this construction the plate 2 is accurately positioned independently of the bar 6.

The driving pinion 23, integral or fast with shaft 14 and the handwheel 24, is also supported on shaft 14 through an adapter or shaft extension 25 having a squared tapered end which fits the square opening 26 in the hub of the wheel. The wheel turns with the shaft, except for a slight angular relative motion between the two provided for by a threaded or helical connection between the shaft and the adapter. The shaft is accordingly threaded at 27 while the adapter has the internal thread 28. The adapter has a clutch surface 29 for engagement with the clutch disc 30 fast to the hub of a one-way holding device such as ratchet wheel 21.

The threaded connection between the shaft 14 and adapter or shaft extension 25 and the clutching surfaces between the adapter and the ratchet 21 are located externally of the housing so that, in case of damage thereto, the adapter may be easily replaced without dismantling the entire mechanism. To protect these parts an annular cover fits around the adapter and is secured to the plate 2. The hub of the ratchet is supported in the bearing 16 and extends therethrough so that the clutch disc 30 is located in front of the bearing. The hub of the ratchet thus supports the shaft 14 at its front end.

The ratchet wheel is also faced with a clutch disc 31 for coaction with a flange 32 on pinion 23. By turning the wheel 24 in a right hand direction, as indicated by the arrow 33 (Fig. 1), the initial motion of the wheel is free of the pinion shaft until it is turned far enough on the thread 27 to change the relationship of the coacting clutch elements from that indicated by Fig. 3 to that indicated by Fig. 2.

Figure 3:
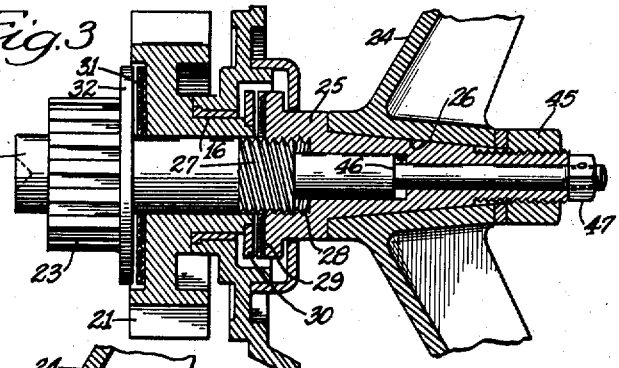
Fig. 3 is a fragmentary sectional view of part of the mechanism shown in Fig. 2 for comparison therewith to show disengaged relationship of clutch elements.
Figure 2:
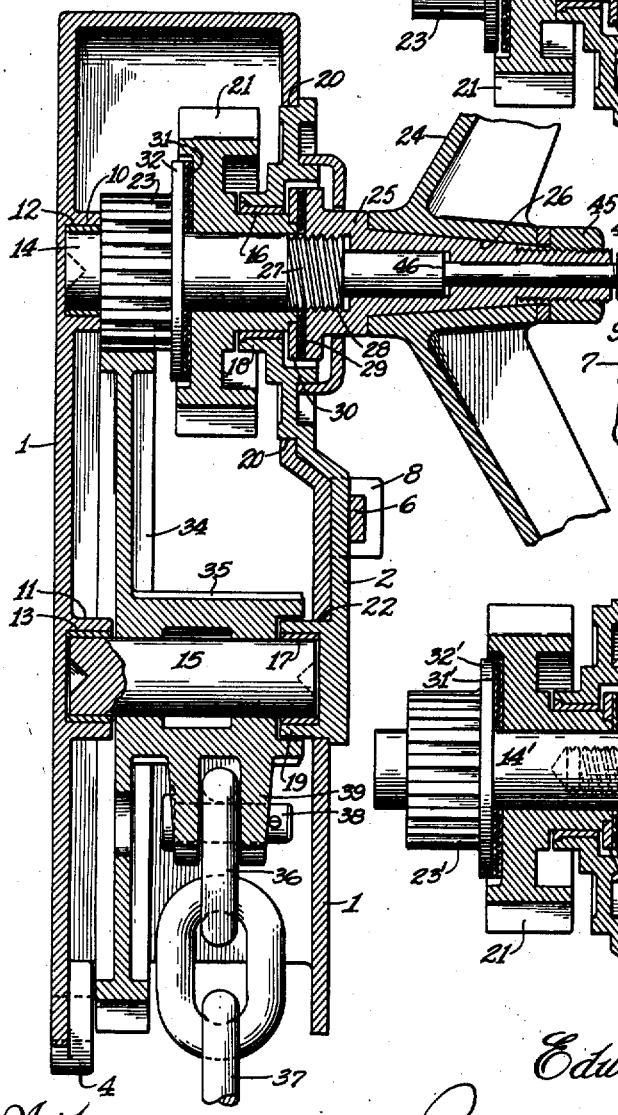
Fig. 2 is a vertical sectional view as indicated by the line 2—2 on Fig. 1.
Figure 7:
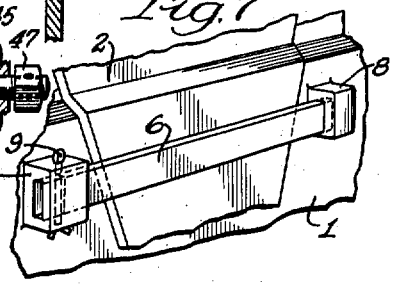
Fig. 7 is a fragmentary perspective view showing how the casing and a cover plate thereof are locked together without the use of rivets or other fastening means interfering with quick assembly or disassembly of the construction.

In Fig. 3 the ratchet wheel is free of the pinion shaft and in Fig. 2 the ratchet wheel is shown clamped to the pinion shaft between the flange 32 on the pinion and the clutch facing 29 on the wheel adapter 25. The arrangement provides a direct drive between the handwheel and the brake rigging in either application or release directions. Right hand motion of the handwheel is transmitted through shaft 14 and the pinion thereon to gear 34 meshing with the pinion and integral with winding sprocket 35 to which the end link 36 of the brake operating chain 37 is secured by pin 38 passing through apertured ears 39 formed on the sprocket.

Figure 5:
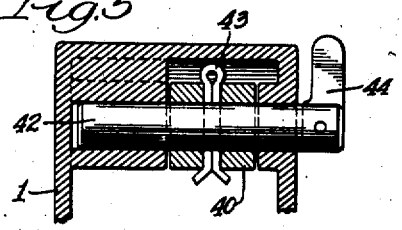
Fig. 5 is a similar section to that shown in Fig. 4, but shows the ratchet holding pawl with an operating lever whereby the pawl may be manually engaged or disengaged, if desired.
Figure 4:
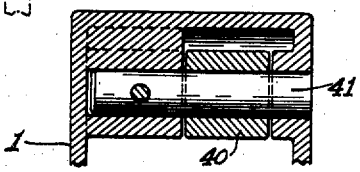
Fig. 4 is a sectional detail as indicated by the line 4—4 on Fig. 1.

The ratchet wheel 21 never rotates backwardly, except for a fraction of a tooth space. It is held against backward rotation by gravity pawl 40. The pawl is ordinarily loose on its supporting pin 41 which is pinned to casing 1 as shown in Fig. 4, but when it is desired to provide the pawl with an operating lever it is mounted as shown in Fig. 5. The pawl is then pinned to a shaft 42, as indicated at 43. Operating lever 44 is secured to the shaft.

The handwheel is rigidly clamped to the adapter 25 by nut 45. Thus, the handwheel may be easily removed by removing the nut 45 without affecting the clutching mechanism in either its clutched or unclutched positions. The adapter and handwheel are limited in motion outwardly along shaft 14 by the nut 47 pinned to shaft 14, and inwardly along shaft 14 by the ratchet when the latter is clamped against the pinion.

When the ratchet wheel 21 is clamped between the clutch discs 29 and 31, the same total pressure is exerted by each disc since action and reaction are equal. Since the two discs are preferably of the same material and consequently have the same coefficient of friction with the ratchet wheel, the frictional forces exerted by the discs are the same. But the disc 31 has a greater outside diameter than the disc 29 with substantially the same inner diameter, so that the mean effective diameter of the disc 31 is greater than that of the disc 29. Thus with the same frictional force but acting at a different diameter, less torque is required to release the disc 29 than the load on the pinion exerts on the disc 31. This structure thereby facilitates release of the brake.

When the brakes are applied as far as possible by right hand rotation of handwheel 24 there is a reaction pressure from the brakes ordinarily amounting to about 4,000 pounds which is resisted through the gearing by pawl 40. When the handwheel is turned to the left sufficiently to unclutch the ratchet wheel 21 from shaft 14, the shaft is free to rotate under the reaction of the brakes and instantly causes the clutch to re-engage by screwing the clutch back into clamping position according to the inertia or the drag on wheel 24 applied by the operator or by the friction element 29. However, if the wheel is deliberately spun faster than the releasing motion of the brakes, the brakes may be entirely freed of the holding resistance of the ratchet; otherwise, the freeing motion of the brakes is by increments according to left hand motion imparted to handwheel 24 by the operator. This is a convenient and safe way of releasing the brakes. The clutch lining 29 offers resistance to the backward rotation of the handwheel and prevents instantaneous violent release of the brakes such as occurs when a ratchet pawl is withdrawn from a ratchet wheel. Since the effective diameter of clutch 29 is less than that of clutch 31 and since the latter has the function of holding the brake, the former may be caused to slip more easily than the latter. Many brake operating mechanisms of the reverse spin type and others of the non-spin type, except with extraordinary exertion of the operator, have the disadvantage of instantaneous full release of the brakes rather than any desired partial release that may be wanted for controlling a car.

Figure 6:
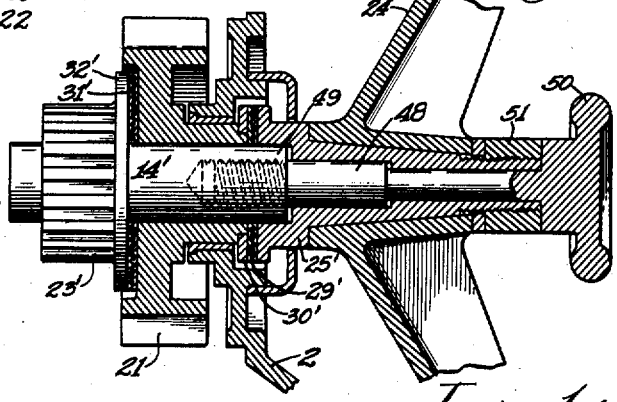
Fig. 6 is a sectional view similar to that shown in Fig. 3 but with the addition of a separate wheel for actuating the clutch.

Fig. 6 shows a modification whereby a handwheel 24 and an adapter 25' are mounted on a shaft 48 and are ordinarily free to rotate ineffectively on the shaft. These may, however, be connected to the pinion 23' and shaft 14' through clutches 29', 30', 31', and 32'. Instead of making the shaft in one part as in Figs. 2 and 3, this is done by making the shaft of interfitting sections 14' and 48, which have threaded engagement at 49. A small clutch operating wheel 50 is formed at the outer end of shaft 48. By turning the wheel in a right hand direction it is screwed into shaft 14', drawing that section of the shaft and section 48 together. Wheel 50 bears against the end of the adapter 25' and the handwheel fastening nut 51. This serves to force the adapter and the pinion 23' against opposite sides of the ratchet wheel engaging it at the clutch surfaces. By such a means the ratchet is rendered effective or ineffective for holding the brake, and the handwheel 24 is at the same time clamped to the operating mechanism for operation, or released therefrom.

The assemblage of the mechanism is a simple matter and may be as follows:

The bushings 12 and 13 are first slipped into the bosses 10 and 11 of casing 1; axle or shaft 15 and the gear 34, with the sprocket are placed in position; then the face plate 2 with the handwheel unit assembled therein, comprising wheel 24, shaft 14, ratchet wheel 21, and the pinion 23, are placed into position in the casing 1 and locked thereto by bar 6.

I claim as my invention:

1. In a railway car hand brake mechanism, the combination of a driving pinion, shaft means including a rotary operating shaft to which the pinion is fixed, a ratchet wheel loose on the shaft, a pawl for holding the ratchet wheel in one direction, a clutch cooperating with the shaft and ratchet wheel to clutch and unclutch the ratchet wheel and the shaft, a hand wheel attached to one end of the shaft means, said shaft means also including a square tapered end for receiving the hand wheel for a non-rotating connection and arranged for easy removal of hand wheel without affecting the clutching mechanism in either its clutched or unclutched positions.

2. In a railway car hand brake mechanism, the combination of a horizontal shaft having a driving pinion fixed thereto, an extension for the shaft having threaded engagement with the shaft, said extension being provided with a tapered square end, an operating wheel removably attached to the square end of the extension, a ratchet wheel loose on the pinion shaft, a pawl for holding the ratchet wheel against movement in one direction, a clutch cooperating with the shaft and the ratchet wheel to clutch and unclutch the ratchet wheel and the shaft, said clutch being arranged for operation by relative movement between the pinion shaft and the extension thereof on the threaded connection between the shaft and the extension.

3. In a railway car hand brake mechanism a housing and winding mechanism mounted in the housing, said housing including a detachable supporting plate for winding mechanism, a bearing in the plate, operating mechanism mounted in said bearing and including a driving pinion for driving said winding mechanism, a hand wheel and a connection between the hand wheel and pinion providing for limited relative movement between the hand wheel and pinion, and said connection including clutching means for positively connecting and disconnecting the hand wheel with the driving pinion upon relative movement between the hand wheel and the pinion.

4. In a railway car hand brake mechanism, the combination of a driving pinion, a rotary operating shaft to which the pinion is fixed, means for holding the shaft against rotation in one direction, a clutch cooperating with the shaft and holding means for clutching and unclutching the holding means and the shaft, a hand wheel, and means for connecting the hand wheel and shaft arranged for removal of the hand wheel without affecting the clutching mechanism in either its clutched or unclutched positions.

5. A railway car hand brake comprising, in combination, a housing comprising spaced front and rear walls, winding mechanism and operating mechanism mounted in said housing on vertically spaced axes, said front wall being provided with a pair of apertures respectively coaxial with said mechanisms, and a detachable supporting plate mounted on the front face of said front wall and having a pair of bearings located in said apertures for supporting said mechanisms.

6. A railway car hand brake comprising, in combination, a housing comprising spaced front and rear walls, winding mechanism and operating mechanism mounted in said housing on vertically spaced axes, said front wall being provided with a pair of apertures respectively coaxial with said mechanisms, the aperture for said operating mechanism being of sufficient size to permit the removal therethrough of the operating mechanism as a unit, and a detachable supporting plate mounted on the front face of said front wall and having a pair of bearings located in said apertures for supporting said mechanisms.

7. A railway car hand brake comprising, in combination, a housing comprising spaced front and rear walls and an open bottom, winding mechanism located in the lower part of the housing and including a shaft, operating mechanism located in the upper part of the housing, said front wall being provided with a pair of apertures respectively coaxial with said mechanisms, the aperture for said operating mechanism being of sufficient size to permit the removal therethrough of the operating mechanism as a unit, said winding mechanism being removable through the open bottom and its shaft being removable through the other aperture, and a detachable supporting plate mounted on the front face of said front wall and having a pair of bearings located in said apertures for supporting said operating mechanism and said shaft.

8. A railway car hand brake comprising, in combination, a housing comprising spaced rigidly connected front and rear walls, winding mechanism and operating mechanism mounted in said housing on vertically spaced axes, said mechanisms being supported at their rear ends by said rear wall, said front wall being provided with a pair of apertures adjacent the mechanisms, a detachable plate for supporting the front ends of said mechanisms mounted on the front face of said front wall and extending into said apertures, and means for securing said plate to said housing, said plate being rigidly supported by said front wall independently of said securing means whereby the support of the front ends of the mechanisms is held in accurate alinement with the support of the rear ends thereof.

9. A railway car hand brake comprising, in combination, a housing comprising spaced rigidly connected front and rear walls, winding mechanism and operating mechanism mounted in said housing on vertically spaced axes, said mechanisms being supported at their rear ends by bearings in said rear wall, said front wall being provided with a pair of apertures coaxial with said rear bearings, a detachable plate having a pair of bearings for supporting the front ends of said mechanisms, said plate being mounted on the front face of said front wall with the bearings on the plate fitting snugly in said apertures whereby the front and rear bearings for both mechanisms are held in accurate alinement.

10. In a railway car hand brake, the combination of a pinion, manually actuated means for operating said pinion, shaft means connecting said pinion and said manually actuated means, a one-way holding device, clutching surfaces between said device and said pinion, clutching surfaces between said device and said manually actuated means, said shaft means including a threaded connection arranged to cause clutching and unclutching of both of said clutching surfaces whenever relative rotation between said pinion and said manually actuated means occurs, said first-mentioned clutching surfaces having a greater mean effective diameter than said second-mentioned clutching surfaces whereby the torque necessary to release the manually actuated means will be less than the torque holding the pinion against rotation.

11. In a railway car hand brake, the combination of a one-way holding device, a pinion located on one side of said device, clutching surfaces between said device and said pinion, manually actuated means for operating said pinion located on the other side of said device, similar clutching surfaces between said device and said means, shaft means connecting said pinion and said manually actuated means and including a threaded connection arranged whenever relative rotation between said manually actuated means and said pinion occurs to clamp and unclamp said device between said pinion and said manually actuated means, said first-mentioned clutching surfaces having a greater mean effective diameter than said second-mentioned clutching surfaces whereby, when said device is so clamped, the torque required to release the manually actuated means will be less than the torque holding the pinion against rotation.

12. In a railway car hand brake, the combination of a pinion, manually actuated means for operating said pinion, shaft means connecting said pinion and said manually actuated means, a one-way holding device, clutching surfaces between said device and said pinion, clutching surfaces between said device and said manually actuated means, said shaft means including a threaded connection arranged to cause clutching and unclutching of both of said clutching surfaces whenever relative rotation between said pinion and said manually actuated means occurs, said first-mentioned clutching surfaces exerting a greater frictional torque than said second-mentioned clutching surfaces whereby the force required to turn the hand wheel in a releasing direction is substantially less than the load on the pinion.

13. A railway car hand brake comprising, in combination, a housing, winding mechanism within the housing, a pinion within the housing for operating said mechanism, a ratchet within the housing and having a portion extending through the front wall thereof, a shaft on which said pinion and ratchet are mounted and extending through the front wall of the housing, manually actuated means for operating said pinion located externally of the housing, said means including a threaded connection with said shaft and having a clutch surface cooperating with said extending portion of the ratchet for clamping the ratchet between the pinion and said surface upon relative rotation between said means and said pinion, and an annular cover secured to the front of the housing for protecting said threaded connection and said clutch surface.

14. A railway car hand brake comprising, in combination, a housing, winding mechanism within the housing, a pinion within the housing for operating said mechanism, a ratchet within the housing and having a hub extending through the front wall of the housing and journalled in said front wall, a shaft for said pinion and ratchet, said shaft being journalled at its rear end in the rear wall of the housing and at its front end in said hub, and manually actuated means for operating said pinion, said means including a threaded connection with said shaft and having a clutch surface cooperating with said hub for clamping said ratchet between said pinion and said surface upon relative rotation between said means and said pinion.

15. A railway car hand brake comprising, in combination, winding mechanism, a shaft, a ratchet mounted on said shaft for rotational and longitudinal movement relative thereto, a pinion for operating said mechanism fixed on the shaft on one side of said ratchet, manually operated means having a threaded connection with said shaft on the other side of said ratchet, a bearing supporting said shaft at said other side of the ratchet, and a stop on said shaft, said ratchet being adapted to be clamped between said pinion and said means when said means is rotated in one direction relative to the shaft, said ratchet being longitudinally movable between said pinion when clamped and said bearing when unclamped, and said means being longitudinally movable between said ratchet when clamped and said stop when unclamped.

16. In a railway car hand brake, the combination of a pinion, a shaft comprising interfitting sections one carrying said pinion, a one-way holding device including a movable member to which the pinion is adapted to be clutched, a shaft extension adapted to be pressed against said movable member to cause clutching engagement thereof with the pinion, said shaft extension when so pressed being rotatable with said pinion and movable member as a unit, a hand wheel mounted on said shaft extension, and the other shaft section having a clutch operating wheel and a threaded connection with the first-mentioned section for pressing said shaft extension against said movable member.

17. A railway car hand brake comprising, in combination, winding mechanism, a shaft member, a pinion for operating said mechanism fixed on said shaft member, an extension member having a threaded connection with the shaft member, a hand wheel mounted on said extension member, a one-way holding device including a movable element mounted on said shaft member and adapted to be clamped between said pinion and said extension member when the hand wheel and extension member are rotated in one direction relative to the pinion and shaft member and to be unclamped when said parts are relatively rotated in the other direction, the clamping of said movable element limiting the relative rotation in said one direction, and a pin projecting from one of said members through the other member and having a stop on its end to limit the relative rotation in said other direction.

18. A railway car hand brake comprising, in combination, winding mechanism, a pinion for operating said mechanism, a shaft to which said pinion is fixed, a one-way holding device including a movable member to which the pinion is adapted to be clutched, hand operated means including a threaded portion connected with said shaft, said threaded connection causing said hand operated means, said shaft, and said one-way holding device to be operatively connected when said hand operated means is operated in a winding direction, and said threaded connection causing said hand operated means and said shaft to be clutched together and said pinion to be clutched to said one-way holding device when the pinion is rotated relative to said hand operated means by the winding mechanism.

EDWIN E. VAN CLEAVE.